United States Patent [19]

Nakano et al.

[11] 4,332,452
[45] Jun. 1, 1982

[54] ELECTRIC SHUTTER FOR CAMERA

[75] Inventors: Yoshiyuki Nakano; Etsuo Tanaka, both of Tokyo, Japan

[73] Assignee: Nippon Kogaku K.K., Tokyo, Japan

[21] Appl. No.: 215,343

[22] Filed: Dec. 11, 1980

[30] Foreign Application Priority Data

Dec. 20, 1979 [JP] Japan ................................ 54-164700

[51] Int. Cl.³ .......................... G03B 9/32; G03B 9/62
[52] U.S. Cl. ..................................... 354/234; 354/243
[58] Field of Search ............... 354/234, 235, 241–244, 354/245, 246, 266, 267

[56] References Cited

U.S. PATENT DOCUMENTS 3,087,401  4/1963  Maurer et al. .................. 354/243
4,137,539  1/1979  Maitani ........................ 354/243 X

*Primary Examiner*—L. T. Hix
*Assistant Examiner*—William B. Perkey
*Attorney, Agent, or Firm*—Fitzpatrick, Cella, Harper & Scinto

[57] ABSTRACT

An electric shutter for camera is operable selectively with manual control mode in which the shutter time is set manually or with automatic exposure control mode in which a proper shutter time is set automatically. The preciseness of shutter time is improved by using one and single control cam in manual control mode as well as in automatic control mode.

6 Claims, 3 Drawing Figures

ELECTRIC SHUTTER FOR CAMERA

BACKGROUND OF THE INVENTION

1. Field of the Invention

The present invention relates to an electric shutter for a camera capable of performing in an automatic exposure control mode.

2. Description of the Prior Art

As the control system for controlling the shutter time of an electric shutter for a camera there are known and used the following three types of systems:

Type 1

In manual control mode, in which the shutter time is set manually, as well as in automatic exposure control mode in which a proper shutter time is set automatically, the shutter time is controlled by changing the time of holding a closing member, such as a rear curtain, latched. The holding time is determined by a timer circuit in either case. If the brightness of an object becomes extremely high in automatic exposure control mode, then the shutter assumes a position finally in which the shutter no longer opens, namely no slit for exposure can be formed.

Type 2

This is a modification of the above mentioned Type 1. A mechanical limiter is provided. When the brightness of an object is very high in automatic control mode, the limiter prevents the shutter time from being shorter than a certain limit.

Type 3

Manual control is carried out mechanically employing a particular closing member latching and releasing mechanism which is proper to the manual control mode. For automatic exposure control mode there is provided an electromagnet to hold and release the closing member.

All of the above mentioned control systems have their own disadvantages. In the case of Type 1, in particular that of focal plane shutter, it is known that shutter time varies from part to part in one and the same picture plane, which results in some irregularity of shutter time over the picture plane as a whole. This irregularity of shutter time is very minute. However, when the shutter time is extremely short, the irregularity becomes remakable to such extent that the adverse effect on the result of photographing is no longer negligible. In the worst case some area or fractions of the surface of a picture may be left unexposed.

The system of Type 2 is free of the above mentioned disadvantage. However, it has another problem inherent in an electric shutter. Timing of releasing the closing member is variable from time to time because of the irregularity in On-Off of the electromagnet. By such irregularity of the closing member releasing time the shutter slit width to be formed is made unstable. This problem becomes detrimental to the resulting picture in particular when a precise high speed shutter time (such as some 1/2000 sec.) is required by the photographer and such high speed shutter time is manually set by him.

An important disadvantage involved in the system of Type 3 is found in the complexity of its structure. Moreover, it requires a particular change-over mechanism to select manual control mode or automatic exposure control mode.

SUMMARY OF THE INVENTION

Accordingly it is a general object of the invention to eliminate the disadvantages involved in the prior art apparatus mentioned above.

More particularly it is an object of the invention to provide an electric shutter which permits minimization of the irregularity of shutter time for the highest shutter speed (for example 1/2000 sec.) in manual control mode.

It is another object of the invention to provide an electric shutter which prevents any irregularity of exposure in the case of high brightness by employing a simple limiter for inhibiting any extreme short shutter time by automatic exposure control mode.

It is a further object of the invention to provide such electric shutter which is simple in structure and is able to attain all of the above objects at the same time.

Other and further objects, features and advantages of the invention will appear more fully from the following description of embodiments with reference to the accompanying drawings in which:

FIG. 1 is a perspective view of a preferred embodiment of the invention;

FIG. 2 is a diagram of the control cam used in the embodiment showing also the locus of movement of the roller on the cam to illustrate the manner of operations of the apparatus in manual control mode and in automatic exposure control mode for a common shutter time and for a shortest limit shutter time in the case of automatic exposure control mode; and FIG. 3 is a view similar to FIG. 2 illustrating the manner of operation of the apparatus for the highest speed shutter time set by the manual control mode.

DESCRIPTION OF THE PREFERRED EMBODIMENT

Figure 1:
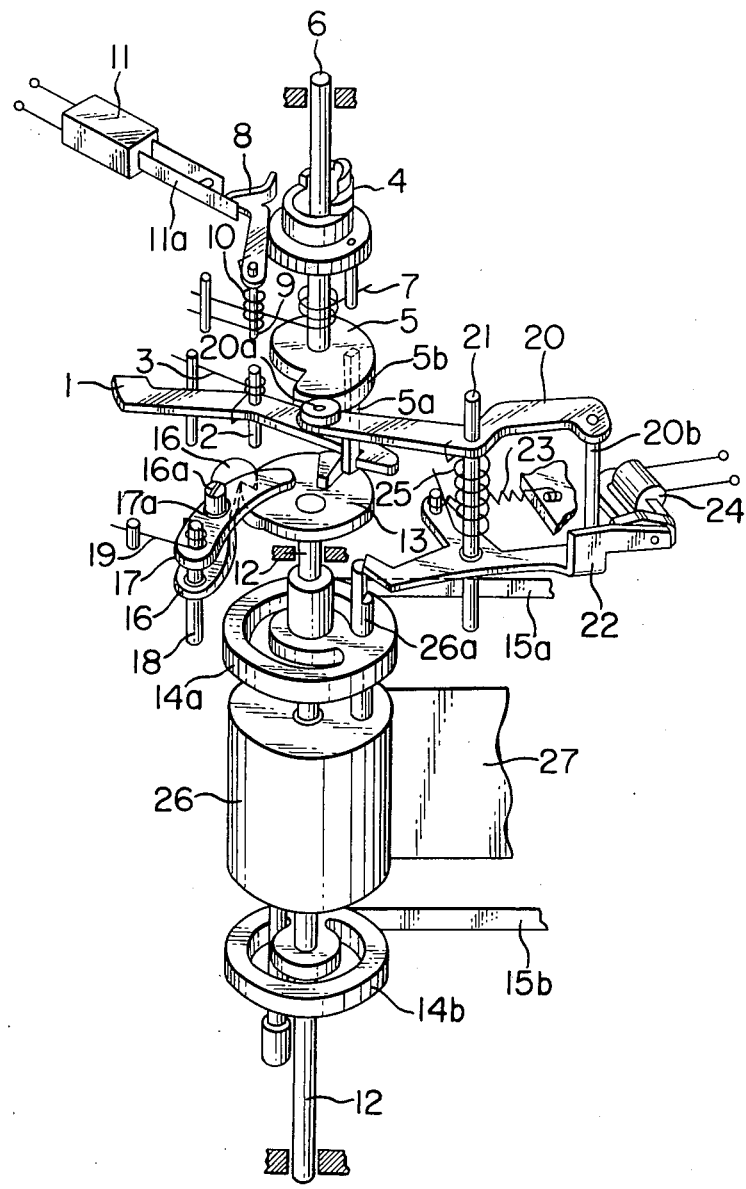

Referring first to FIG. 1 showing an embodiment of the invention, the apparatus is shown in the position prepared for taking a picture after completing a series of preparing operations including film wind-up and shutter charge.

In FIG. 1, reference numeral 1 designates a lever pivotally mounted on a shaft 2 under the biasing force of a spring 3 which intends to rotate the lever clockwise about the shaft. The lever 1 can rotate counter-clockwise interlocking with the operational motion of a mirror turning-up mechanism not shown. Reference numeral 6 is a shaft having a trigger cam 4 at its upper portion and a control cam 5 at its lower portion. The cams 4 and 5 are formed integrally with the shaft 6 and are biased by a spring 7 which intends to rotate the cams clockwise about the axis of the shaft 6. However, in the position shown in FIG. 1, a projection 5a depending from the lower surface of the control cam 5 is in engagement with the right end of the lever 1 and therefore the cams 4 and 5 can not be rotated by the action of the spring 7. A trigger lever 8 is pivotally supported by a pivot 9 and is biased to clockwise rotation by a spring 10. The tip end of the trigger lever 8 lies in the rotation course of the trigger cam 4. A trigger switch 11 constitutes a part of a timer circuit and is normally closed. Opening of the trigger switch 11 brings the timer circuit into operation to start counting the shutter time. The trigger switch is opened when the trigger cam 4 comes into contact with the trigger lever 8 which is then rotated counter-clockwise to come into contact with a contact 11a of the switch 11.

Reference numeral 12 is a shaft having a forward curtain engaging plate 13 and pulleys 14a and 14b fixedly mounted on the shaft. The ribbons 15a and 15b for the forward curtain not shown are fixed to the circumferences of the pulleys 14a and 14b respectively. A tension is applied to the ribbons 15a and 15b by a driving spring (not shown). Therefore, the ribbons 15a and 15b bias the pulleys 14a and 14b and the engaging plate 13 toward clockwise rotation about the shaft 12. In the shown position, however, since the engaging plate 13 is in engagement with a forward curtain latch pawl 16, the pulleys and the engaging plate can not rotate clockwise. The pawl 16 is pivotally mounted on a pivot 18 which has also a forward curtain releasing plate 17 mounted thereon. Extending upright from the upper surface of the pawl 16 is a pin 16a which passes through loosely an opening provided on the releasing plate 17 so that the pawl 16 and the plate 17 can rotate together about the pivot 18. Also, a spring 19 is disposed on the plate 17 so as to bias the pawl and plate toward clockwise rotation. The plate 17 is disposed in the rotation course of the projection 5a depending from the control cam 5 so that the projection 5a can contact with the plate 17 to rotate the latter counter-clockwise. With the counter-clockwise rotation of the plate 17 the pawl 16 is also rotated in the same direction to release the engagement with the engaging plate 13. A shaft 21 pivotally supports a roller carrying lever 20 at its upper portion and a rear curtain engaging lever 22 at its lower portion. The lever 22 is under the action of a spring 23 which intends to rotate the lever clockwise. However, in the shown position, a charge spring 25 disposed on the shaft 21 prevents the lever from being rotated clockwise. The spring 25 is stronger than the spring 23 and intends to rotate the lever counter-clockwise. The spring 25 acts also upon the lever 20 and intends to rotate the latter clockwise. Under this biasing force of spring 25 a roller 20a provided on the left end of the lever 20 is held in contact with the cam surface 5b of the control cam 5. When the control cam 5 is rotated, the roller carrying lever 20 initially rotates clockwise following the cam surface 5b whose cam lift is gradually increased. However, so long as the engaging lever 22 remains in the position under the attraction of an electromagnet 24, the clockwise rotation of the roller carrying lever 20 is limited by the lever 22. Namely, after rotating a predetermined angular distance, a rod 20b depending from the under surface of the right end part of the lever 20 comes into contact with the lever 22 which prevents the lever 20 from being further rotated. Thus, at this time point, the roller 20a separates away from the cam surface 5b.

A rear or second curtain 27 is fixed on a drum 26 which is in turn rotatably mounted on the shaft 12. The rear curtain 27 is under a tension applied by a driving spring not shown. Therefore, the rear curtain 27 intends to rotate the drum clockwise about the shaft 12. The drum 26 has an upright rod 26a extending upward passing through a C-shaped slot provided in the pulley 14a. In the shown position, the upright rod 26a is in engagement with the left side end of the engaging lever 22. Therefore, in this position the drum can not rotate clockwise and the rear curtain 27 is held in the position against the driving force of the driving spring.

The manner of operation of the above electric shutter is as follows:

For the sake of explanation it is assumed that the camera has a shutter speed setting dial calibrated in seconds up to the highest speed shutter time 1/2000 sec. At first, description will be made of operation in manual shutter control mode and in automatic shutter control mode for all the shutter times other than the highest speed shutter time, 1/2000 sec.

When the operator pushes down the shutter releasing button of the camera, the mirror turning-up mechanism (not shown) is actuated at once. In link with the motion of the mirror turning-up mechanism, the lever 1 starts to rotate counter-clockwise from the position shown in FIG. 1. Thereby, the control cam 5 is disengaged from the lever 1. Now, the control cam is allowed to rotate together with the trigger cam 4. After a predetermined angle of rotation as an approach run, the trigger cam 4 comes into contact with the trigger lever 8 to open the switch 11. Thereby the timer circuit starts counting the time. After a further rotation of the control cam 5, its projection 5a comes into contact with the forward curtain releasing plate 17 and rotates the locking pawl 16 counter-clockwise. Since the forward curtain engaging plate 13 is now released from the engagement with the pawl, the plate 13 starts rotating clockwise together with the pulleys 14a and 14b so that the forward or first curtain (not shown) starts running to open the shutter.

For manual control mode, the electromagnet 24 continues attracting the rear curtain engaging lever 22 until the timer circuit completes the counting of the manually set shutter time. For automatic exposure control mode, the electromagnet continues attracting the lever 22 until the timer circuit completes the counting of a proper shutter time determined by the operation of an automatic exposure control circuit. It is of course possible to form the timer circuit in such manner that counting may be started by closing of the trigger switch 11.

Operation of the shutter after the electromagnet 24 being deenergized at an ordinary shutter time will be described hereinafter with reference to FIG. 2.

Figure 2:
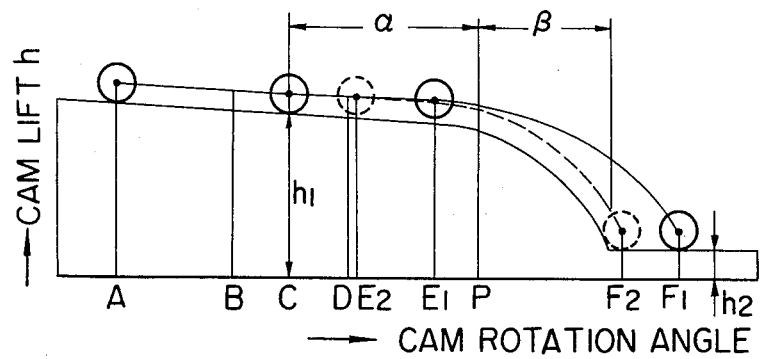

FIG. 2 is a diagrammatic view of the control cam 5 and also a graph showing the locus of the roller 20a during this phase of operation, plotted with the cam lift h as the ordinate and the rotation angle of the cam as the abscissa.

In FIG. 2, the point A indicates the starting position of the cam 5 corresponding to the position shown in FIG. 1 in which the roller 20a is in contact with the cam surface 5b under the biasing force of the spring 25. With the rotation of cam 5, the cam lift is gradually decreased starting from the point A. At the point B, the timer circuit starts counting the time as described above. At the point C, the rod 20a on the roller carrying lever 20 rotating clockwise following the cam surface 5b comes into contact with the rearward curtain engaging lever 22 which prevents further clockwise rotation of the lever 20. Therefore, after the point C, the roller 20a is maintained at the cam lift $h_1$. Since the cam lift on the cam surface 5b continues decreasing further, the roller 20a separates from the cam surface 5b. At the point D, the forward curtain engaging plate 13 is released from the engaged state and therefore the forward curtain starts running. The timer circuit counting the set shutter time in manual control mode or automatic control mode makes the electromagnet 24 deenergized at the point $E_1$. Thereby, the rear curtain engaging lever 22 is released from the attraction force and is allowed to rotate clockwise together with the roller carrying lever 20 connected therewith through the rod 20b. With the rotation of the lever 20, the roller 20a which has been kept apart from the cam surface 5b at the level of cam lift $h_1$ moves in the direction to decrease cam lift describing a parabolic curve as shown by the solid line in FIG. 2. As the roller 20a moves in this manner, the rear curtain locking lever 22 rotates clockwise so that the engagement between the lever 22 and the upright rod 26a of the rear curtain drum 26 is gradually loosened. At the point $F_1$, the roller 20a reaches the position of cam lift $h_2$ and the rear curtain drum 26 is finally disengaged from the lever 22. Thereby, the drum is allowed to rotate clockwise and the rear member 27 starts running to close the shutter.

When the brightness of the object is high, an extremely high speed shutter time may be set in automatic exposure control mode. In this case, the following operation takes place:

In the same manner as in the above case, the roller carrying lever 20 is made fixed at cam lift $h_1$ and at the point D the opening member, that is, forward curtain starts running. Because of the very high speed shutter time, the electromagnet 24 is deenergized immediately after the start of running of the forward curtain. Namely, the roller carrying lever 20 is released from the attraction of the electromagnet 24 at the point $E_2$. The roller 20a moves in the direction to decrease the cam lift. The locus of the roller in this case is shown by the broken line in FIG. 2. The locus indicates that the roller 20a comes into contact with the cam surface 5b in the area $\beta$ and thereafter it moves along the cam surface 5b up to $F_2$. At the point $F_2$ where the cam lift is $h_2$, the rear curtain 27 is released from the engagement with the lever 22. Thus, the rear curtain starts running. At the area $\beta$, the cam surface is so contoured as to describe a parabola corresponding to the shortest limit of shutter time (for example, about 1/3000 sec.) at which no irregularity of exposure throughout the picture plane may occur. Therefore, the rear curtain 27 starts running at the point $F_2$ with a time lag of about 1/3000 sec. after the start of running of the forward curtain. Thus, however fast the electromagnet 24 may be deenergized after the start of time counting, the rear curtain 27 can not start running at a shutter time shorter than the limit determined by the contour of the cam area $\beta$ (in this case it is about 1/3000 sec.). In other words, at the area $\beta$, the cam 5 serves as a limiter for preventing the shutter time from being shortened to such a value for which the irregularity of exposure on the picture plane becomes substantial.

Figure 3:
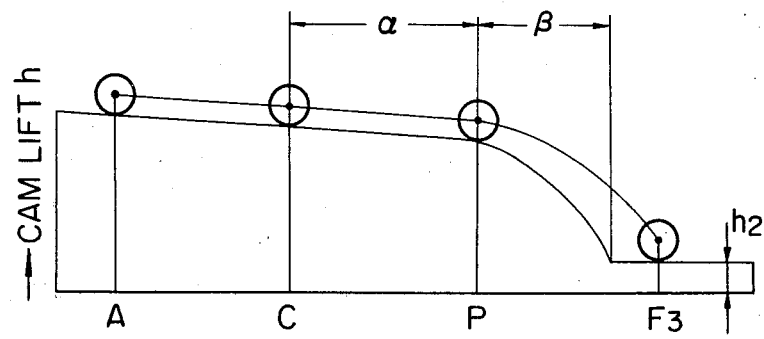

FIG. 3 illustrates the manner of operation for such case wherein manual control mode is selected and the highest speed shutter time that is, for example, 1/2000 sec. is set at the shutter setting dial.

In this case, the rear curtain latching lever 22 is released from the attraction of the electromagnet 24 before the point C at which the roller carrying lever 20 and the latching lever 22 are united together by the rod 20b and the departure of the roller 20a from the cam surface 5b begins thereby. As seen from FIG. 3, since the electromagnet 24 is made inactive prior to the point C, the roller 20a in this case continues to move following the cam surface 5b even after passing over the point C. The cam surface 5b has two differently contoured areas, namely the first half area $\alpha$ and the second half area $\beta$ with the inflection point P therebetween. After running along the first area $\alpha$, the roller 20a departs from the cam surface 5b at the point of inflection point P and thereafter it goes on moving apart from the cam surface up to the point $F_3$ where the cam lift is $h_2$. The point $F_3$ is a point at which the highest speed shutter time then set at the shutter setting dial can be attained correctly. To this end, the contour of the cam area $\alpha$ is so predetermined as to adjust the initial velocity of the roller 20a toward the cam lift at the inflection point P to the value at which the roller can correctly reach the cam lift $h_2$ at the point $F_3$, namely the rotation angle corresponding to the highest speed shutter time for manual control mode. The biasing force of the spring 25 disposed between the two levers 20 and 22 for holding the connection between the levers is stronger than that of the spring 23 disposed between the lever 22 and a stationary part of the apparatus. Therefore, the rear curtain latching lever 22 moves together with the roller carrying lever 20 and the rear curtain 27 is disengaged from the lever 22 at the time point at which the highest speed shutter time is attained (the point $F_3$). In this phase of operation, the lever 22 gradually rotates clockwise during the time period from point C to the inflection point P. This gradually lessens the depth of the engagement between the lever 22 and the rod 26a on the rear curtain drum 26. At the point P there remains only a small amount of engagement to be released during the time period from the point P to the point $F_3$ at the cam lift $h_2$. Therefore, the possible irregularity of time required to release the engagement can be minimized and a correct and precise shutter time can be attained thereby.

For the highest speed shutter time in manual control mode the electromagnet 24 may be left unexcited all the time. Namely, the shutter releasing operation may be started without anchoring the lever 22 by the attraction force of the electromagnet 24. The operation proceeds in entirely the same manner as above in this case.

After every operation of the shutter described above, the cam 5 is rotated counter-clockwise in link with the motion of film wind-up or of shutter charge to return the once released roller carrying lever 20 and rear curtain locking lever 22 to their start positions shown in FIG. 1.

As for the two areas $\alpha$ and $\beta$ on the cam 5 it is required that the shutter time determined by the cam area $\beta$ should be equal to or shorter than the highest speed shutter time for manual control mode determined by the cam area $\alpha$.

As readily understood from the foregoing, the present invention brings forth advantages over the prior art. According to the invention, only a single control cam is used to control the highest speed shutter time for manual control mode and also to control the shortest limit shutter time for the proper shutter time in automatic exposure control mode. This makes it possible to provide an electric shutter which is simple in structure and stable in operation.

While the invention has been particularly shown and described with reference to a preferred embodiment thereof, it will be understood by those skilled in the art that the foregoing and other changes in form and details can be made therein without departing from the spirit and scope of the invention.

We claim:

1. An electric shutter control device for a camera operable selectively with manual control mode in which the shutter time is set manually or with automatic exposure control mode in which a proper shutter time is set automatically, said electric shutter control device comprising:

a member for opening the shutter in response to a shutter releasing operation;

a member for closing the shutter;

a control cam adapted to start moving in accordance with the shutter releasing operation and which is composed of, at least, a first cam area, a second cam area and a third cam area;

means for latching the closing member and so disposed as to come into contact with said first area, second area and third area of said cam;

an electromagnetic device for attracting said latching means to prevent the contact between said control cam and latching means; and said electromagnetic device controlling said latching means in such manner that when the manual control mode is selected and the highest speed shutter time is set, then said latching means is brought into contact with said third cam area after contacted with said first cam area to release the closing member at the highest speed shutter time and that when the manual control mode is selected and a shutter time other than said highest speed shutter time is set or when the automatic exposure control mode is selected, then said latching means is brought into contact with only the third cam area of said cam to release the closing member at the set shutter time and if the proper shutter time set by the automatic control mode is shorter than a certain shortest limit shutter time which is shorter than said highest speed shutter time, then said latching means is firstly brought into contact with said second cam area of said cam and then continuously contacted with said third cam area to release the closing member at said shortest limit shutter time.

2. An electric shutter according to claim 1 wherein said control cam is so formed as to return said engagement member to its working position for latching the closing member in link with the motion of film wind-up operation of the camera after releasing said closing member.

3. A shutter control device for a camera comprising:

a member for opening the shutter in response to a shutter releasing operation;

a member for closing the shutter;

means for latching the shutter closing member, the latching means being movable between a latching state where the shutter closing member is latched to prevent closure of the shutter and a releasing state where the shutter closing member is released to permit closure of the shutter;

means for controlling movement of the latching means from the latching state to the releasing state;

a control cam actuable in response to the shutter releasing operation and having a first cam area and a second cam area with which can be coordinated with the latching means controlled by the control means to move from the latching state to the releasing state, the latching means when coordinated with the first cam area, reaching the releasing state in a first shutter time and when coordinated with the second cam area, reaching the releasing state in a second time shorter than the first time.

4. A shutter control device according to claim 3, wherein said control cam further includes a third cam area capable of being coordinated with the latching means, the first, second and third cam areas being sequentially capable of coordinating with the latching means controlled from the latching state to the releasing state, the latching means when coordinated with the third cam area, being in the releasing state.

5. A shutter control device according to claim 4, wherein the control cam further includes a fourth cam area with which the latching means in the latching state is capable of being coordinated; and the control cam is so formed that the amount of lift of the cam is decreased from the fourth to the third cam areas through the first and second cam areas in this order.

6. An electric shutter control device for a camera comprising:

a member for opening the shutter in response to a shutter releasing operation;

a member for closing the shutter;

means for latching the shutter closing member;

electromagnetic means for controlling the latching means, the electromagnetic means being operated in a first, second and third time phases;

a control cam adapted to start moving in response to the shutter releasing operation and which is composed of a first cam area, a second cam area and a third cam area; and the latching means, when the electromagnetic means is in the first time phase, being brought into coordination with the third cam area of said cam after coordination with the first cam area to release the shutter closing member; the latching means, when the electromagnetic means is in the second time phase, being brought into coordination with only the third cam area to release the shutter closing member; and the latching means, when the electromagnetic means is in the third time phase, being brought into coordination with the second cam area of said cam and then with the third cam area to release the shutter closing member.

* * * * *